United States Patent
Hartog et al.

(10) Patent No.: US 9,599,272 B2
(45) Date of Patent: Mar. 21, 2017

(54) MONITORING OF THE POSITION OF A PIPE INSPECTION TOOL IN A PIPELINE

(75) Inventors: Arthur Hartog, Winchester (GB); Kevin Forbes, Ashurst Wood (GB); Andrew Strong, Romsey (GB); Roger Hampson, Wokingham (GB)

(73) Assignee: Schlumberger Technology Corporation, Houston, TX (US)

( * ) Notice: Subject to any disclaimer, the term of this patent is extended or adjusted under 35 U.S.C. 154(b) by 512 days.

(21) Appl. No.: 13/054,802

(22) PCT Filed: Feb. 9, 2009

(86) PCT No.: PCT/GB2009/000366
§ 371 (c)(1),
(2), (4) Date: Nov. 15, 2011

(87) PCT Pub. No.: WO2010/010318
PCT Pub. Date: Jan. 28, 2010

(65) Prior Publication Data
US 2012/0067126 A1 Mar. 22, 2012

(30) Foreign Application Priority Data
Jul. 23, 2008 (GB) .................. 0813474.4

(51) Int. Cl.
*G01N 29/00* (2006.01)
*F16L 55/48* (2006.01)
(Continued)

(52) U.S. Cl.
CPC .............. *F16L 55/48* (2013.01); *G01V 1/001* (2013.01); *F16L 2101/30* (2013.01)

(58) Field of Classification Search
CPC ....... G01V 1/001; G01B 7/003; G01M 3/005; G01M 3/246; G01N 2291/2636; G01N 29/045; F16L 2101/30; F16L 55/48
(Continued)

(56) References Cited

U.S. PATENT DOCUMENTS 2,820,959 A    3/1956   Bell
3,754,275 A *   8/1973   Carter et al. ................ 346/33 P
(Continued)

FOREIGN PATENT DOCUMENTS

DE     19545185     2/1997
DE     10338950     6/2005
(Continued)

OTHER PUBLICATIONS

Barnoski, M.K. and Jensen, S.M., Fiber waveguides: a novel technique for investigating attenuation characteristics. Applied Optics, 1976. 15(9): p. 2112-5.OTDR.
(Continued)

*Primary Examiner* — Helen Kwok
*Assistant Examiner* — Nashmiya Fayyaz
(74) *Attorney, Agent, or Firm* — Chamberlain Hrdlicka

(57) ABSTRACT

Apparatus and a method for monitoring of a pipe inspection tool in a pipeline, the apparatus comprising at least one sensor carrier apparatus being locatable along and in close proximity to a pipeline, a plurality of acoustic sensors being locatable on the sensor carrier apparatus, a pipeline inspection tool which is moveable through the pipeline being detectable by means of the acoustic sensors, and the location of the pipeline inspection tool being able to be determined by means of the acoustic sensors.

12 Claims, 2 Drawing Sheets

(51) Int. Cl.
*G01V 1/00* (2006.01)
*F16L 101/30* (2006.01)

(58) Field of Classification Search
USPC .................. 73/40.5 A, 592, 587, 865.8
See application file for complete search history.

(56) References Cited

U.S. PATENT DOCUMENTS

| | | | |
|---|---|---|---|
| 4,541,278 | A | 9/1985 | Marsh et al. |
| 4,590,799 | A | 5/1986 | Brown et al. |
| 5,194,847 | A | 3/1993 | Taylor et al. |
| 5,417,112 | A | 5/1995 | Rosenberg |
| 5,549,000 | A | 8/1996 | Brown et al. |
| 8,261,623 | B2 * | 9/2012 | Miller et al. .............. 73/865.8 |
| 2008/0312850 | A1 * | 12/2008 | McDonnell ................ 702/56 |

FOREIGN PATENT DOCUMENTS

| | | |
|---|---|---|
| GB | 2126820 | 3/1984 |
| GB | 2305989 | 4/1997 |
| GB | 2394549 | 4/2004 |
| GB | 2436142 | 9/2007 |
| WO | 2004/036342 | 4/2004 |
| WO | 2006/048647 | 5/2006 |
| WO | 2010/020796 | 2/2010 |

OTHER PUBLICATIONS

Conduit, A.J. and Hartog, A.H., Spectral- and length-dependent losses in optical fibres investigated by a two-channel backscatter technique. Electronics Letters, 1980. 16 (3): p. 77-78.

Eriksrud, M. and Mickelson, A., Application of the backscattering technique to the determination of parameter fluctuations in multimode optical fibers. Quantum Electronics, IEEE Journal of, 1982. 18(10): p. 1478-1483.

Murdoch, S.G. and Svendsen, D.A., Distributed Measurement of the Chromatic Dispersion of an Optical Fiber Using a Wavelength-Tunable OTDR. Lightwave Technology, Journal of, 2006. 24(4): p. 1681-1688.

Healey, P., Fading in heterodyne OTDR. Electronics Letters, 1984. 20(1): p. 30-2.

Posey, R.J., Johnson, G.A., and Vohra, S.T., Strain sensing based on coherent Rayleigh scattering in an optical fibre. Electronics Letters, 2000. 36(20): p. 1688-89.

* cited by examiner

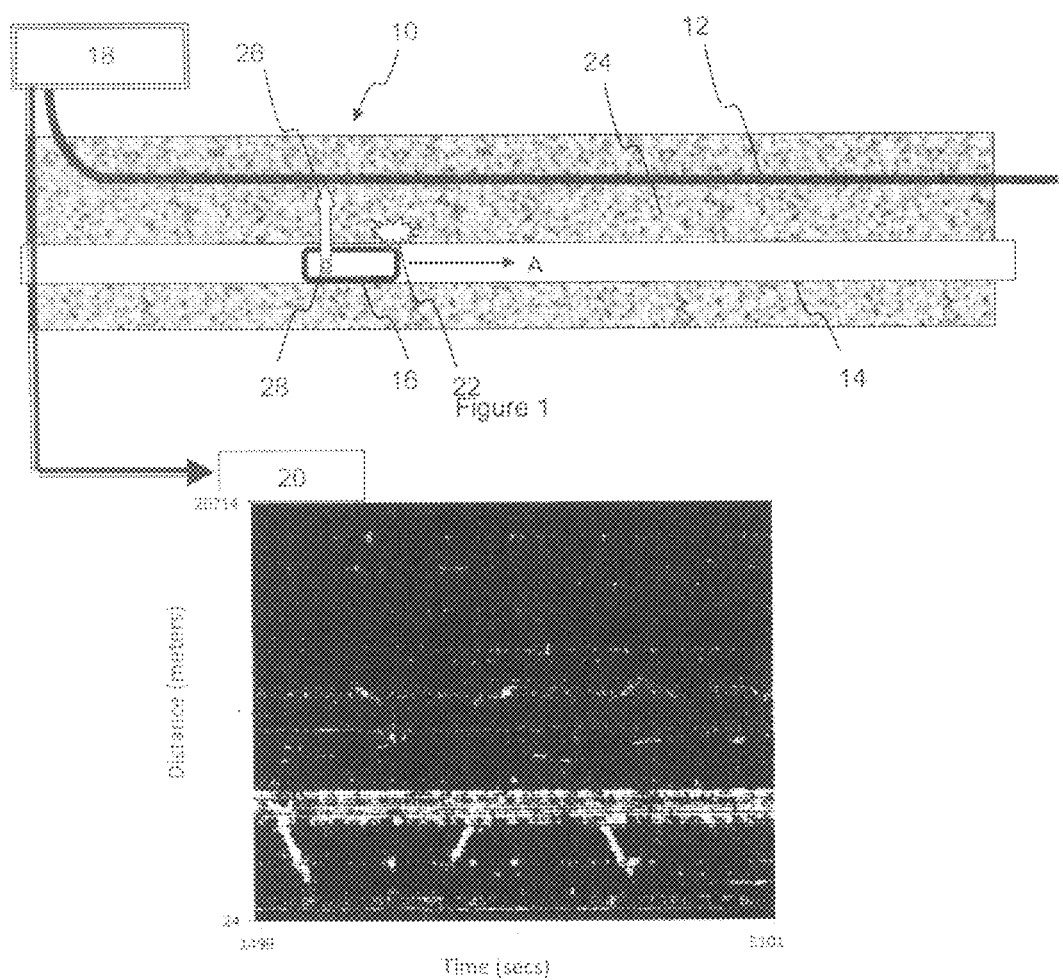

MONITORING OF THE POSITION OF A PIPE INSPECTION TOOL IN A PIPELINE

TECHNICAL FIELD

This invention relates to apparatus and a method for monitoring the position of a pipe inspection tool in a pipeline. In particular, the invention relates to apparatus and a method for monitoring the position of a pipe inspection tool in a pipeline in the oil and gas industry.

BACKGROUND ART

The technology of monitoring the condition of pipelines relies on several distinct technologies, such as, for example, pigging, overflight, visual inspection, sensor monitoring such as acoustic monitoring, measurement of potential on cathodic protection systems and many others.

The deployment of distributed fibre-optic sensors on a pipeline has been proposed for the simultaneous measurement of temperature, strain and disturbance affecting the pipeline. The aim of this proposed apparatus is to identify events affecting the pipeline such as leaks, ground movement and third party intervention, as well as frost heave, scouring of the backfill and many others. In addition, commercial systems are available for measuring temperature profiles and fibre-optic disturbance measurements are becoming available which are based either on interferometric arrays or, on a fully distributed basis on coherent Rayleigh backscatter, modalmetric change detection or combined Sagnac/Michelson interferometry.

Typically the disturbance sensors are placed alongside or on the pipeline with the intention of detecting inadvertent or deliberate intrusion on the pipeline. These systems are thus intended to avoid incidents involving often many tens of fatalities which are possible where, for example, an earth moving vehicle hits a pipe or as a result of attempted product theft.

The current invention involves the cooperative operation of arrays (or continua) of acoustic sensors placed on or nearby a pipe of a pipeline with pipe inspection tools or pigs running inside the pipe.

The use of the vibration generated by a pipe inspection tool or pig as a means of determining the rate of progress of the pig has been identified in GB 2 305989, U.S. Pat. No. 4,541,278 and GB 2 394 549. However, in both of these patent applications, all the sensing is within the pig itself. The concept of listening to the pig with continuous sensor arrays outside the pipe is not disclosed. U.S. Pat. No. 5,417,112 proposes installing a pair of geophone-type sensors at discrete locations along the pipe. It also discussed the combination of geophones and magnetometers. U.S. Pat. No. 4,590,799 discusses tracking a pig from signals recorded by a geophone coupled to the pipeline wall at a specified location, near known acoustic features. Going back even further in time U.S. Pat. No. 2,820,959 discusses an electromagnetic transmitter within a pig, used by someone walking along the pipe route to detect a stuck pig. U.S. Pat. No. 5,549,000 discusses acoustic sensors, preferably shear mode geophones, including multiplexed fibre-optic sensors, but all are attached intimately to the pipe.

The current invention provides an accurate and easily operable means to monitor the progress of a pig passing through a pipeline by determining its location and speed of movement.

Disclosure of the Invention

A first aspect of this invention provides apparatus for monitoring of a pipe inspection tool in a pipeline, comprising:
  at least one sensor carrier apparatus being locatable in close proximity to a pipeline and along of the length of the pipeline;
  a plurality of acoustic sensors being locatable on the sensor carrier apparatus;
  a pipeline inspection tool which is moveable through the pipeline being detectable by means of the acoustic sensors; and
  the location of the pipeline inspection tool being able to be determined by means of the acoustic sensors.

The plurality of acoustic sensors are preferably in the form of one or more arrays.

In one form of the invention at least one of the acoustic sensors may detect the noise that a pipe inspection tool makes and the acoustic sensor may then determine the location of the pipe inspection tool in the pipeline. This location is related to time and the speed of advance of the pipe inspection tool through the pipeline may thus then be calculated.

Preferably the sensor carrier apparatus is locatable in the backfill of a pipeline.

The acoustic sensors may be used to monitor the progress of the pipe inspection tool through the pipeline. This may include tracking the rate of progress of the pipe inspection tool through the pipeline. The pipe inspection tool may further comprise an on-board logging system. The apparatus may further include means for associating the time at which the pipe inspection tool passed a particular location in the pipeline with time stamps of the on-board logging systems so as to provide a better positional correlation of the log with location in the pipeline. This may be used to determine where a particular problem is in the pipeline.

In one form of the invention the pipe inspection tool may be instrumented. The instrumented pipe inspection tool may be used to transmit active acoustic signals. These active acoustic signals may be periodic signals to facilitate its location and/or coded signals to convey messages of specific significance. The apparatus may further include signal processing equipment for receiving active acoustic signals emitted from the pipe inspection tool.

Even further the apparatus may include a data interpretation device for determining information on the state of the pipeline based on the acoustic signature of the pipe inspection tool as it passes through the pipeline. In this case, the acoustic signature may be made up of a passive acoustic signature or an active acoustic signature.

The sensor carrier apparatus may be in the form of a cable. Preferably the sensor carrier apparatus is a sensor cable. The sensor cable may include acoustic sensors in the form of at least one fibre optic cable.

Further according to the invention the acoustic sensors are used to collect background data through the pipeline before the pipeline inspection tool is moved through the pipeline. The apparatus can further include means for removing background data. The background data may then be removed from the data collected by the acoustic sensors when the pipeline inspection tool moves through the pipeline.

A second aspect of this invention provides a method of monitoring of a pipe inspection tool in a pipeline, the method comprising:

connecting interrogation electronics to a plurality of acoustic sensors located on a sensor carrier apparatus which is located in close proximity and along at least a section of the pipeline;

detecting the acoustic data of a pipeline inspection tool which is moving through the section of pipeline by means of the acoustic sensors and interrogation electronics; and determining the location of the pipeline inspection tool by means of the acoustic sensors and interrogation electronics.

Further according to the invention the method of monitoring of a pipe inspection tool in a pipeline may further comprise determining at least one of the progress of the pipe inspection tool through the pipe, the condition of the pipeline based on the noise made by the pipe inspection tool during its passage through the pipeline and/or collecting information actively transmitted by the pipe inspection tool through acoustic transmitters.

Even further according to the invention the method of monitoring of a pipe inspection tool in a pipeline may further comprise locating the sensor carrier apparatus having a plurality of acoustic sensors located thereon along at least a section of the pipeline.

In one form of the invention the interrogation electronics are connected to existing acoustic sensors located along at least a section of the pipeline.

In one form of the invention the method may further include detecting background data through the pipeline before detecting the acoustic signature of the pipeline inspection tool. In this way the acoustic data of the pipeline inspection tool may be identified by separating it from the background data.

The plurality of acoustic sensors are preferably in the form of one or more arrays.

The method can further include relating the location of the pipe inspection tool to time, and then calculating the speed of advance of the pipe inspection tool through the pipeline.

In one form of the invention when the pipe inspection tool is instrumented and the method further includes using the instrumented pipe inspection tool to transmit active acoustic signals. The method can further comprise receiving active acoustic signals emitted from the pipe inspection tool at signal processing equipment.

According to a third aspect of the invention there is provided a method of monitoring a pipeline using the apparatus for monitoring a pipe inspection tool in the pipeline as described above.

Further aspects of the invention will be apparent from the following description.

BRIEF DESCRIPTION OF THE DRAWINGS

FIG. 1 shows a schematic overview of a monitoring apparatus according to an embodiment of the invention;

FIG. 2 shows a graph of one set of data collected over a day where several areas of significant activity can be seen during an instrumented pigging run.

MODE(S) FOR CARRYING OUT THE INVENTION

Figure 3:
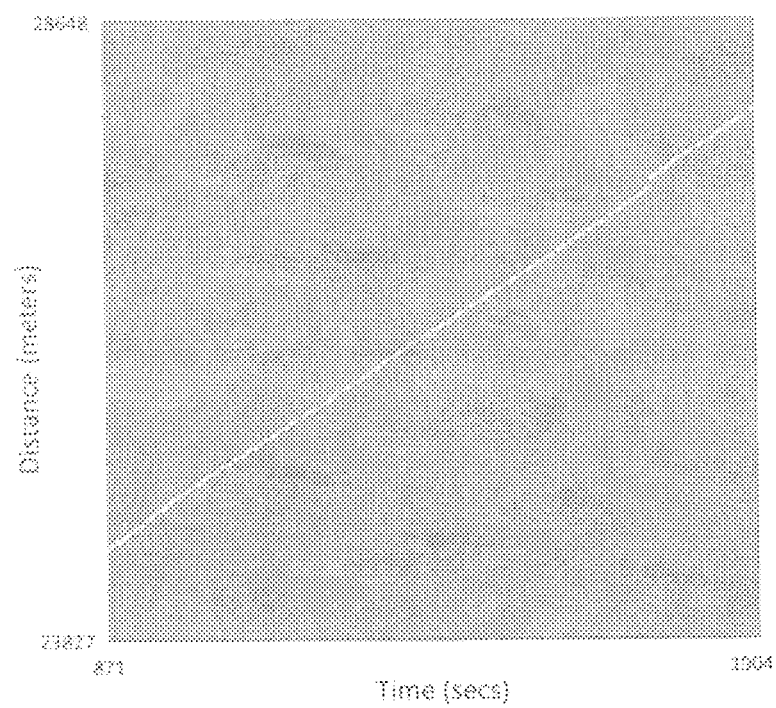
FIG. 3 shows a graph of the path of the instrumented pig through a short section of pipeline, where all the background noise has been eliminated.

An embodiment of apparatus 10 for monitoring of a pipeline inspection tool in a pipeline according to the invention is shown in FIG. 1. The pipeline to which the apparatus according to the invention may be applied is preferably for use in the oil or gas industry.

The invention covers apparatus 10 which includes acoustic sensors in the form of an array in a sensing cable 12 that is placed on or nearby a pipeline 14 or the use of an existing system of acoustic sensors in a sensing cable 12 on or nearby a pipeline 14. The apparatus 10 of the invention further includes a pipeline inspection tool or pig 16, as it is otherwise known, and the interrogation or acquisition equipment 18 which is connected to processing equipment and software 20, the interrogation equipment 18 being connected to the acoustic sensors of sensing cable 12. The processing equipment and software 20 is used for signal processing, data archiving, data transmission, and decision making. There is then a cooperative operation between the arrays (or continua) of acoustic sensors placed on or nearby the pipeline 14 with the pig or pigs 16 that are running or operating inside the pipeline.

At its most basic, the monitoring apparatus 10 of the invention involves using such an acoustic sensor array (or distributed acoustic sensor) to locate a passive pig 16, by detecting the noise 22 the pig 16 makes as it moves through the pipeline 14 in direction A and determining its location from the reading of the acoustic array (or distributed sensor). The speed of advance of a pig 16 through a section of pipeline is often not known accurately and in fact it is common practice for the engineer responsible for a pigging operation to go to a pumping station upstream of the end of the pigging section and then to listen for the passage of the pig in order to improve their estimate of the time of arrival of the pig at the far end of the route. The engineer can thus prepare the pig-catcher to receive the pig 16 at the appropriate time. Therefore by plotting the position of the pig 16 along the pipeline by using the apparatus 10 of the invention, the speed of advance of the pig 16 can be determined.

Further, the invention consists in the installation of arrays of acoustic sensors buried in the backfill 24 of a pipeline 12 and used at least in part to monitor the progress of a pig 16, including one or more of the tracking its rate of progress through the pipeline, including associating the time at which the pig passed a particular location in the pipeline with time stamps of the on-board logging systems, so as to provide a better positional correlation of the log with location through the pipeline and thus determine with better accuracy where a particular problem is occurring.

The pig may be used to transmit either periodic signals to facilitate its location and/or coded signals to convey messages of specific significance. These active acoustic signals 26 emitted from the pig 16 by an onboard acoustic transducer 28 are used to provide further information on the state of the pipeline based on the acoustic signature of the pig passing through the pipeline.

Apparatus 10 therefore describes a system, consisting of a) the acoustic sensor array, b) the pig, which itself may have a variable degree of functionality and c) the acquisition, signal processing and data interpretation equipment.

The invention further consists of a method for pipeline condition monitoring involving the installation of an acoustic sensor array along a continuous section of a pipe route, connecting the array to interrogation electronics for recording acoustic signals along the entire continuous section and determining at least one of the progress of the pig along the pipe, the condition of the pipe based on the noise made by the pig during its passage and/or collecting information actively transmitted by the pig through acoustic transmitters.

The sensors are preferably optical fibre sensors and more preferably the optical fibre sensors are to be built into a carrier apparatus such as a cable structure that can be manufactured in long continuous lengths such as the sensing cable 12 of FIG. 1.

One example of such optical fibre sensors, are interferometric arrays that can be constructed by incorporating into a fibre a series of reflectors at discrete points. The optical fibre separating each reflector forms a sensor that integrates the acoustic influence along its length. Whilst the fibre sensor elements are frequently wound into coils in order to enhance their sensitivity, in the present invention it is preferred to rely on the natural coupling between the soil, the cable and the fibre.

Another example of the acoustic sensing technology that can be applied to the invention is that of coherent optical time-domain reflectometry. The origins of the technique lie in optical time domain reflectometry a well-known technique for measuring the distribution of a number of parameters of an optical fibre, such as attenuation core diameter, numerical aperture, and even chromatic dispersion.

More specifically, its background lies in the speckle-like effects that occur when a narrow-band source is used in an optical time domain reflectometer to interrogate a single-mode fibre. In essence, the interrogating pulse can be thought of occupying a certain length of the fibre and, assuming that the pulse is coherent, all the electric dipoles arising from the scattering at non-homogeneities within the glass have a fixed (though random) phase relationship to one another. The resulting backscatter signal for a particular section of the fibre must then be treated as the coherent sum of all the electric fields of these dipoles; this sum is of course dependent on the phase as well as the amplitudes of each dipole. Thus for a fixed laser frequency and a fixed state (temperature, strain etc) of the fibre, the backscatter return (relative to the pulse energy) from a particular location is fixed, but randomly related to the return from any other section of fibre. By backscatter return, we mean the optical power as detected by, for example, a photodiode back at the launching end. The backscatter signature under these conditions thus takes the form of spiky waveform, with excursions about the mean value of at least a factor of ten. When the state of the fibre is varied, the vector summation changes and the return thus changes. It is this effect that and similar works seek to exploit for detecting intruders into a perimeter or even for measuring dynamic strain, i.e. changes in a strain level without particular interest in the absolute strain value.

There are thus multiple means of using optical fibre cable as a distributed acoustic sensor or an acoustic sensor array. [Here the term distributed is used to denote a continuously sensitive sensor, where any point on the fibre provides a response to the measurement, whereas a sensor array is a (generally) serially-arranged set of discrete sensing elements]. Each of the elements in an array is sensitive independently of its neighbours, but the location of an influence within an element cannot be determined to better than one array element]. As described in the art such acoustically-sensitive cables are ideally suited for detecting intrusion along long objects such as pipeline and it has been proposed to bury such cables in the vicinity of a buried pipeline, preferably immediately above it, in order to detect intrusion before damage to the pipe results. It is the object of this invention to provide an additional utility for such an acoustically-sensitive cable in providing additional information during pigging operations and improving the pipeline condition monitoring.

In its simplest form, the acoustically-sensitive cable 12 detects the progress of a pig 16 during its travel through the pipeline 14. This is useful operationally to plan its arrival and read the pig catching device. In addition, its velocity can be plotted in real time, rather than having to await the log after the pig has been retrieved. This in itself can identify areas where the velocity is slowed, for example, by deposits or increased friction due to corrosion. This facility provides a real-time, accurate, fix on the pig location. As an example, using coherent optical time-domain reflectormeter (OTDR), the spatial resolution can be 10 m over distances of 100 km. This provides very accurate determination of the pig location. In the case of Smart Pigs (which have on-board data logging systems to measure parameters such as corrosion, distortion and deposition within the pipe), it is within the scope of this invention, to associate this accurate location information with the on-board logs in order to improve the location accuracy of any problem areas that have been identified.

In a further aspect to the invention, the pig used can emit acoustic signals by means of a transducer that are detected by the external acoustically sensitive cable. Such a facility has a number of useful applications, including provision of a health check on the pig, and pin-pointing locations of problem areas. For example, if a corrosion-inspection pig identifies an area of abnormal readings, indicating possible corrosion, then it can transmit a signal that is picked up by the sensing cable. This then allows the location of the problem area to be determined extremely accurately, probably much more accurately than the dead-reckoning navigation on board the pig.

By coding these acoustic transmissions, specific information can be transmitted whilst the pig is still far from its point of arrival. This would allow remedial work to be carried out immediately if the problem was sufficiently severe. As an example, if a deposition condition were discovered that is so severe that immediate chemical or thermal treatment is required, this can be effected before the pig has completed its journey.

One way in which the information can be coded is for a resonating mechanical structure, driven by movement and pig vibration to be tuned in its frequency so that a particular note can be heard from the outside of the pipe.

In yet another aspect of this system, the acoustically sensitive cable provides signals that are used to determine the condition of the pipeline from the acoustic signature that accompanies the passage of the pig. The fact that the frequency spectrum of the pig noise is a function of the condition of the pipeline is well known, but it has not been proposed to be carried out with an acoustically sensitive cable. For example, the characteristic noise of the pig will depend on the roughness of the inner surface of the pipe, on the deposits within the pipe and even on the uniformity of the soil surrounding the pipe. This aspect is particularly important for an un-instrumented (dumb) pig. Instrumented (smart) pigs have one or more sensors built into them that can provide similar information as just described; however pigs used solely for scrapping the insides of the pipe have no on-board sensing and by combining their passage with an acoustically-sensitive cable outside the pipe, much of the same functionality can be provided with no additional capital cost.

The equipment required at the end to interrogate the acoustically-sensitive cable will depend on the type of cable (whether it contains a sensor array or a distributed sensor); however, in all cases an acoustic time-series will be obtained for each array element (or sampling point in the case of a distributed sensor). The processing may involve a time-domain signal where an increase in the fluctuations (noise) is correlated with a position along the fibre. When the pig position is detected, the signal processing software then in addition carries out spectral domain processing (e.g. using a Fourier transform) in order to identify key characteristics of the pig, such as its noise frequency and intensity. This information is then used by a software interpretation package to extract information on the location and velocity of the pig, the condition of the pipeline, the condition of the pig and/or the condition of the soil surrounding the pipeline.

Another way in which the apparatus and method of the invention may be used to more reliably track the position of a pig in a pipeline is to first remove the effects of background data in the form of noise from the environment around the pipeline. The first task is therefore to detect and collect background data before the pigging run through the pipeline. FIG. 2 shows a graph of a set of acoustic data collected over a day to create a library which could be used to permit background noise rejection during the tracking of the pig itself. The graph of FIG. 2 shows several areas of activity, including a highly built-up area, and a number of vehicle/traffic movements along a section of pipeline. This data is then later to be used to remove the ambient noise from the data collected during the instrumented pigging run using the event or signal recognition features of the system of software.

FIG. 3 shows the graph of an instrumented pig run through the pipeline where the background data collected previously, as illustrated in FIG. 2, has been eliminated from the resulting data. FIG. 3 shows the path of the pig through the short section of the pipeline on a plot of position versus elapsed time. It can be seen that the background noise has been eliminated, leaving only the signature of the pig itself. The line in FIG. 3 reflects the software recognition of the acoustic signature of the pig, and the position of the pig is hence reported to within 2 m along the entire length of the pipeline.

The ability to reliably track the position of a pig in a pipeline is particularly useful in instances where the pig becomes stuck, the last reported position being the most likely location.

Further changes can be made as appropriate.

The invention claimed is:

1. An apparatus for monitoring a pipeline inspection tool as the pipeline inspection tool travels through a pipeline, the apparatus comprising:
   an acoustically-sensitive cable located proximate to and outside the pipeline and extending along a length of a continuous section of the pipeline, the acoustically-sensitive cable comprising a distributed optical acoustic sensor located closely proximate to and detached from the pipeline and configured to detect an acoustic signature of the pipe inspection tool as the pipeline inspection tool moves through the inside of the section of the pipeline and provides a signal based on the detected signature, wherein the acoustic signature comprises at least one of a continuous passive acoustic signature and an active acoustic signature; and
   a data interpretation device configured to determine information related to a state of the pipeline based on the provided signal as the pipe inspection tool moves through the pipeline.

2. An apparatus as claimed in claim 1, further comprising means for associating a time at which the pipe inspection tool passed a particular location in the pipeline with time stamps of on-board logging systems to provide a positional correlation of a log with location in the pipeline.

3. The apparatus as claimed in claim 1, wherein the distributed optical acoustic sensor is configured to determine a location of a problem area within the pipeline inspection tool.

4. The apparatus as claimed in claim 1, wherein the pipe inspection tool comprises an instrumented pipe inspection tool.

5. The apparatus as claimed in claim 1, further comprising signal processing equipment configured to receive active acoustic signals emitted from the pipe inspection tool.

6. The apparatus as claimed in claim 1, wherein the acoustically-sensitive cable comprises a fiber optic cable.

7. A method for monitoring a pipeline inspection tool as the pipeline inspection tool passes through a pipeline, the method comprising:
   connecting interrogation electronics to an acoustically-sensitive cable comprising a distributed optical acoustic sensor, the acoustically-sensitive cable and the distributed optical acoustic sensor located closely proximate to, detached from, and outside the pipeline and extending along a length of a continuous section of the pipeline;
   generating a continuous passive acoustic signature of the pipeline inspection tool as the pipeline inspection tool moves through the inside of the section of the pipeline;
   transmitting an active acoustic signature from an acoustic transmitter of the pipe inspection tool;
   detecting the acoustic signature of the pipeline inspection tool moving through the section of pipeline using the acoustically-sensitive cable and the interrogation electronics, the acoustic signature comprising at least one of the active acoustic signature and the passive acoustic signature; and
   determining information relating to a state of the pipeline based on the acoustic signature of the pipe inspection tool as the pipe inspection tool moves through the pipeline.

8. The method as claimed in claim 7, further comprising determining at least one of a progress of the pipe inspection tool through the pipeline and a condition of the pipeline based on noise from the pipe inspection tool when passing through the pipeline and/or based on collecting information actively transmitted by the pipe inspection tool.

9. The method as claimed in claim 7, further comprising connecting the interrogation electronics to an existing distributed optical acoustic sensor located along at least a section of the pipeline.

10. The method as claimed in claim 7, further comprising determining a location of the pipe inspection tool using the distributed optical acoustic sensor and calculating a speed of the pipe inspection tool by relating the location of the pipe inspection tool to time.

11. The method as claimed in claim 7, wherein the pipe inspection tool transmits active acoustic signals to signal processing equipment.

12. The method as claimed in claim 11, further comprising receiving the active acoustic signals emitted from the pipe inspection tool at the signal processing equipment.

* * * * *